US011964850B2

(12) United States Patent
Assfalg et al.

(10) Patent No.: US 11,964,850 B2
(45) Date of Patent: Apr. 23, 2024

(54) CRANE

(71) Applicant: Liebherr-Werk Biberach GmbH, Biberach an der Riss (DE)

(72) Inventors: Martin Assfalg, Oggelsbeuren (DE); Simon Holl, Betzenweiler (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 369 days.

(21) Appl. No.: 17/448,025

(22) Filed: Sep. 17, 2021

(65) Prior Publication Data

US 2022/0002118 A1 Jan. 6, 2022

Related U.S. Application Data

(63) Continuation of application No. PCT/EP2020/005595, filed on Mar. 6, 2020.

(30) Foreign Application Priority Data

Mar. 20, 2019 (DE) ..................... 10 2019 107 142.9
Oct. 2, 2019 (DE) ..................... 10 2019 126 687.4

(51) Int. Cl.
*B66C 13/54* (2006.01)
*B66C 15/02* (2006.01)

(52) U.S. Cl.
CPC .............. *B66C 13/54* (2013.01); *B66C 15/02* (2013.01)

(58) Field of Classification Search
CPC ......... B66C 13/54; B66C 15/02; B66C 23/00; B62D 33/0636; B62D 33/063; E02F 9/166
See application file for complete search history.

(56) References Cited

U.S. PATENT DOCUMENTS 3,080,981 A * 3/1963 Kuschel .................. B66C 13/54 212/290
4,018,473 A * 4/1977 Chalupsky ......... B62D 33/0636 296/190.04
9,382,099 B2 * 7/2016 Aquino ..................... B66B 9/16
(Continued)

FOREIGN PATENT DOCUMENTS

DE 154164 3/1982
DE 254567 3/1988
(Continued)

OTHER PUBLICATIONS

EP 2,719,652 A1 Machine Translation (Year: 2014).*
EP 0870725 A1 Machine Translation (Year: 1998).*

*Primary Examiner* — Michael R Mansen
*Assistant Examiner* — Juan J Campos, Jr.
(74) *Attorney, Agent, or Firm* — Levine Bagade Han LLP

(57) ABSTRACT

The present invention relates to a crane with a height-adjustably mounted control or personnel stand that can be lifted and lowered by at least two lifting elements, wherein the two lifting elements are articulated to a balancing rocker that is mounted on a rocker bearing head connected to the control or personnel stand so as to be luffable about a horizontal pivot axis, wherein a monitoring and/or safety device is provided to monitor and/or ensure the safety of the control stand. According to the invention, the pivot axis is configured as a measurement axis for detecting the load state of the luffable bearing of the balancing rocker and for providing a load signal to the monitoring and/or safety device.

20 Claims, 4 Drawing Sheets

(56) References Cited

U.S. PATENT DOCUMENTS

| | | | | |
|---|---|---|---|---|
| 9,809,422 B2 * | 11/2017 | Mayer | B66C 23/62 | |
| 10,087,051 B2 * | 10/2018 | Assfalg | B66C 11/16 | |
| 2016/0083229 A1 * | 3/2016 | Assfalg | B66C 13/12 | 212/257 |

FOREIGN PATENT DOCUMENTS

| | | | |
|---|---|---|---|
| EP | 0870725 | * 10/1998 | B66C 13/54 |
| EP | 2719652 | 4/2014 | |
| GB | 1411177 | 10/1975 | |
| RU | 2482053 | 5/2013 | |
| WO | WO 2020/187599 | 9/2020 | |

* cited by examiner

CRANE

CROSS-REFERENCE TO RELATED APPLICATIONS

This application is a continuation of International Patent Application Number PCT/EP2020/05595 filed Mar. 6, 2020, which claims priority to German Patent Application Numbers DE 10 2019 107 142.9 filed Mar. 20, 2019 and DE 10 2019 126 687.4 filed Oct. 2, 2019, all of which are incorporated herein by reference in their entireties.

BACKGROUND

The present invention relates to a crane with a height-adjustably mounted control or personnel stand that can be lifted and lowered by at least two lifting elements, wherein the two lifting elements are articulated to a balancing rocker that is mounted on a rocker bearing head connected to the control or personnel stand so as to be luffable about a horizontal pivot axis, wherein a monitoring and/or safety device is provided to monitor and/or ensure the safety of the control stand.

Height-adjustable control stands can be mounted for example on the tower of a crane so as to be longitudinally traversable and hence height-adjustable, wherein such a crane tower can carry a boom in a manner known per se, from which a lifting cable runs to a load hook, possibly via a trolley longitudinally traversable on the boom. Said tower can be telescopably and/or luffably mounted on an upper-carriage, which can be mounted on an undercarriage that is traversable on the ground about an upright axis. Such cranes sometimes are referred to as mobile fast-erecting cranes.

In principle, however, said control stand can be provided on a conventional tower crane or also on another type of crane, wherein the control stand need not necessarily be traversably mounted on a tower, but can also be height-adjustably mounted in some other way.

The control and/or personnel stand often is cabin-shaped or configured as a crane operator and/or elevator cabin, wherein it may be advantageous when such a crane operator cabin can be positioned at different working heights for different lifting tasks of the crane.

To ensure the safety of the height-adjustable control stands or elevator cabins, even if persons such as the crane operator also are transported during the height adjustment, particular safety measures are required. On the one hand, this includes the provision of two lifting elements connected in parallel, in order to achieve the necessary redundancy. On the other hand, the proper function of said lifting elements and of the suspension of the control stand is additionally monitored in order to be able to detect any faulty behavior or even breakage in good time.

Due to the articulation of the two lifting elements to a balancing rocker, the adjusting comfort can be increased on the one hand, as said balancing rocker compensates the lifting forces of the lifting elements or can compensate a jerky or not completely synchronous starting process to a certain extent. Said lifting elements can be lifting cables that suspend the balancing rocker and hence the control stand from above. In principle, however, it might also be considered to use actuators, for example in the form of pressure medium cylinders, as lifting elements that can pull or push the balancing rocker into the desired position.

To be able to detect malfunctions such as for example a slack cable, cable breakage, cable elongation or a faulty cable spooling, it has been proposed already to monitor the angular position of the balancing rocker by mechanical limit switches, which are actuated by a swivel arm of the balancing rocker when the balancing rocker reaches a predetermined swivel or rocking position. Said balancing rocker generally is pretensioned into a non-deflected neutral position by one or more spring devices so that said balancing rocker will luff up or down only in the case of major irregularities in the application of force by the two lifting elements, and is rotatorily deflected to such an extent that said limit switches are actuated. For example, when one of the lifting cables is wound up distinctly more quickly than the other one, the balancing rocker will adjust itself more and more strongly, wherein a pre-critical state can be indicated for example by a first limit switch. When a slack cable is formed on the lifting cable hauled more slowly, or when one of the two lifting cables tears completely, so that only the other lifting cable carries the balancing rocker and hence the control stand, a maximum rotatory deflection will occur, which can be indicated by another limit switch.

On the other hand, a "normal" overload of the elevator cabin must also be detected, for example when one person too much enters the cabin or the stand or a person carries an item of equipment that is too heavy so that the permissible load capacity possibly is exceeded only slightly. As the aforementioned limit switches, which indicate strong tilting on tearing of a lifting cable, do not respond in the case of such slight exceedances, further sensors must be mounted in order to detect such an overload state.

Thus, by clever arrangement of various mechanical limit switches, various critical states can be detected and indicated.

However, the previous safety and/or monitoring devices are relatively expensive. When a distinction is to be made between different critical states, various mechanical limit switches are necessary, wherein the spring action on the balancing rocker is to be adapted correspondingly. On the other hand, even with a more complex configuration of the safety and/or monitoring device it has been difficult so far to perform sufficiently fine monitoring in order to be able to intervene in the control of the crane in good time.

Therefore, it is the object underlying the present invention to create an improved crane of the type mentioned above, which avoids the disadvantages of the prior art and develops the latter in an advantageous way. In particular, the aim is to achieve, by simple means, a sensitive monitoring of the suspension and the operation of the height-adjustable control and/or personnel stand, which can distinguish between various critical states, to not only enable an emergency shutdown, but also to enable the control device of the crane to take advance measures, such as counteracting the actuation of the drives or providing a maintenance indication.

SUMMARY

According to the invention, said object is achieved by a crane according to claim 1. Preferred embodiments of the invention are subject-matter of the dependent claims.

Hence, it is proposed to integrate the monitoring of the control stand suspension into the pivot axis, which luffably mounts the balancing rocker on the rocker bearing part connected to the control stand. The pivot axis on the one hand serves to pivotally mount the balancing rocker and at the same time effects a detection of the load state on the rocker bearing so that the pivot axis fulfills a dual function. According to the invention, the pivot axis is configured as a measurement axis for detecting the load state of the luffable support of the balancing rocker and for providing a load signal to the monitoring and/or safety device. Said measurement axis in particular can be configured as a force measuring bolt that pivotally connects the balancing rocker to the rocker bearing head and at least detects transverse forces transversely to the pivot axis.

Due to the fact that the pivot axis is not a normal axle bolt, but at the same time serves as a measurement bolt or measurement axis, the suspension of the control stand can be of more compact design and can do with less components. At the same time, this provides for a sensitive detection of the forces acting between balancing rocker and rocker bearing head.

To be able to use such a simple measurement axis to distinguish between a normal overload state, for example too many persons in the cabin on the one hand, and a mechanical irregularity on the lifting elements and the balancing rocker, such as a cable breakage or a faulty spooling on the other hand, a lever mechanism can be associated with the balancing rocker and/or the rocker bearing head and/or the measurement axis in an advantageous embodiment of the invention, which lever mechanism converts tilting movements of the balancing rocker and/or of the rocker bearing head, which exceed a predetermined degree, into a noticeable or detectable change of the load acting on the measurement axis or the bearing forces acting on the measurement axis. Said lever mechanism in particular can be configured to convert a holding and/or braking moment, which occurs on stopping and/or braking of a relative rotation of the balancing rocker relative to the rocker bearing head or is necessary therefor, into a bearing force acting on the measurement axis. For example, when one of the lifting cables or elements breaks, the balancing rocker as such would rotate until the holding force applied by the remaining lifting element goes perpendicularly through the measurement axis. However, when the rotation is braked or stopped beforehand, said lever mechanism can convert the holding or braking moment necessary therefor into a force that significantly changes the load acting on the measurement axis.

Said lever mechanism in particular can comprise a swivel limiter that permits a certain amount of pivotal movement between the balancing rocker and the rocker bearing head, which occurs during normal operation, but limits and/or brakes the same when a certain swivel angle is reached, in order to generate said holding and/or braking moment and convert it into a change in the measurement axis load.

In an advantageous development of the invention, pivot stops can be provided on the balancing rocker and the rocker bearing head, which limit the possible swivel movements of the balancing rocker relative to the rocker bearing head. In particular, said pivot stops can be arranged on the balancing rocker and the rocker bearing head in such a way that in a non-deflected neutral position of the balancing rocker the pivot stops are out of engagement and come into engagement only upon reaching a predetermined swivel position of the balancing rocker relative to the rocker bearing head and block a further swivel movement beyond this point.

By means of such pivot stops, major changes of the load state can be generated on the measurement axis when the pivot stops come into engagement, as the load state on the measurement axis changes due to their lever effect.

In particular, by means of such pivot stops and the changes of the load acting on the measurement axis, which are generated thereby, it can be determined which lifting element has failed or is impeded, or of what quality the malfunction is in general, even if the measurement axis is not configured to detect the direction of the load, for example when the measurement axis is not rotatorily fixed, which nevertheless is also possible in conjunction with the pivot stops. Due to the known geometry of the pivot stops and the articulation of the lifting elements as well as the geometry of the balancing rocker, the change of the load state of the measurement axis can be used to infer what change has been obtained on the suspension.

In an advantageous development of the invention, said pivot stops can be arranged on a partial circle around the measurement axis, in particular be arranged directly adjacent to the outer circumference of said measurement axis, so that due to a relative short lever arm with respect to the pivot axis, major changes of the load state will occur when forces are transmitted via the pivot stops.

Advantageously, said pivot stops can be arranged on a partial circle around the measurement axis, whose diameter is smaller than 300% or even smaller than 200% or smaller than 150% of the outside diameter of said measurement axis.

In an advantageous development of the invention, said pivot stops can be arranged in a horizontal plane that extends transversely to the active axis of the lifting elements. In particular, when viewed in the direction of the pivot axis, said pivot stops can be arranged in the range of about 2 o'clock to 5 o'clock or in the range of about 8 o'clock to 10 o'clock.

The arrangement of the pivot stops can be made such that the forces transmitted by the pivot stops, when the pivot stops are in engagement, extend approximately in the direction of the actuating forces of the lifting elements and/or the weight force of the control stand.

To be able to distinguish between various critical states, an evaluating device for evaluating the measurement signal of the measurement axis can be provided in a development of the invention, which evaluating device is configured to determine various critical states of the suspension of the control and/or personnel stand with reference to the height and/or a change of the measurement signal of the measurement axis. In particular, said evaluating device can be configured to compare the measurement signal of the measurement axis with different threshold values in order to determine the load state depending on which threshold value is exceeded or not reached.

For example, the evaluating device can employ a first threshold value that is located in the region of the permissible load capacity of the control and/or personnel stand or characterizes a load of the measurement axis, below which a normal operating state can be assumed and above which a "normal" exceedance of the permissible load capacity can be assumed. In other words, said first threshold value can characterize an operating state in which a transition occurs between a load tolerated yet and too high a load, but in which no abnormal rotation of the balancing rocker relative to the rocker bearing head has occurred yet.

Alternatively or additionally, the evaluating device can compare the measurement axis signal with a second threshold value that characterizes a load of the measurement axis, which only occurs during an abnormal rotation of the balancing rocker relative to the rocker bearing head, in particular due to said swivel limiter which limits the pivotal movement of the balancing rocker relative to the rocker bearing head and multiplies the weight load of the suspension by the weight force of the control and/or personnel stand including payload.

In a development of the invention, said second threshold value can be more than 20% or more than 40% above a load acting on the measurement axis, which occurs at the maximum permitted loading of the control and/or personnel stand when the balancing rocker is not deflected or is only slightly deflected, or in the proper operating state of the lifting elements. Due to such a buffer window between the maximum, normal load capacity and an excessive load acting on the measurement axis due to an excessive deflection of the balancing rocker, as it occurs on cable breakage or faulty spooling, the evaluating device can reliably distinguish between a normal overload due to too many persons on the one hand and a damage of the suspension on the other hand, without therefor requiring further sensors apart from said measurement axis.

Said evaluating device can be of the electronic type, for example comprise switching members integrated into the measurement axis sensor system. Alternatively or additionally, the evaluating device can also be part of an electronic control device, which for example can include a processor and a memory in which said threshold values can be stored. For example, said evaluating device can be part of the electronic crane control device.

Said measurement axis in principle can be configured in different ways in order to detect the transverse forces acting on the measurement axis in terms of their amount and/or direction. For example, a detection device for detecting an elastic deformation of the measurement axis can be associated with the measurement axis. For example, one or more strain gauges can be mounted on said measurement axis in order to detect the deformations of the measurement bolt.

Alternatively or additionally, the measurement axis can be provided with a surface coating that shows a change of the electrical resistance in the case of deformations of the measurement bolt. Such a surface coating can be provided for example in the form of a thin-film coating or in the form of a thin-film sensor.

Alternatively or additionally, a magnetic field-based sensor system can be associated with the measurement axis in order to detect deformations and/or applied forces or tensions acting in the measurement bolt. For example, the measurement axis can serve as an iron core of a transformer circuit so that strains of the measurement axis affect the magnetic properties and hence the voltage across a secondary coil.

Said measurement axis can be non-rotatably attached to the rocker bearing head, wherein the balancing rocker can be rotatably retained at the measurement axis relative to said measurement axis. Alternatively, it would also be possible to non-rotatably attach said measurement axis to the balancing rocker so that it follows the luffing movements of the balancing rocker and rotates with respect to the rocker bearing head.

By fixing a predetermined rotational position of the measurement axis it would be possible to determine the direction of the forces acting on the measurement axis and/or to determine on which sector of the measurement axis the transverse forces act at least for the most part. From the information on which sector the transverse forces act, it might be determined in which relative rotational or rocking position the balancing rocker is disposed relative to the rocker bearing head. From said swivel position of balancing rocker and rocker bearing head relative to each other, the load state can be inferred, in particular unequal positions of the two lifting elements for example due to an asynchronous adjustment.

In principle, however, it is not necessary to not rotatorily fix the measurement axis, for example when merely an absolute amount of the forces transmitted by the measurement axis between balancing rocker and rocker bearing head is to be detected or monitored, for example in order to implement an overload protection. Such an overload protection can become active or intervene, for example, when too many persons enter the control stand or the guidance of the crane operator cabin is jammed.

In an advantageous development of the invention, said rocker bearing head can be rigidly connected to the control stand. Advantageously, said rocker bearing head can be attached directly to the chassis of the control stand. In principle, however, it would also be possible to indirectly articulate said rocker bearing head to the control stand, for example via a steering assembly that retains the rocker bearing head at the control stand.

In a development of the invention, said lifting elements are flexurally slack traction elements in particular in the form of lifting cables. Pull chains or belts are also conceivable.

Alternatively, however, said lifting elements can also be configured in the form of actuators such as hydraulic cylinders, wherein in this case a pressurization of the balancing rocker would also be possible for example in the sense of upward pressure forces.

BRIEF DESCRIPTION OF THE DRAWINGS

The present invention will subsequently be explained in detail with reference to a preferred exemplary embodiment and associated drawings, in which.

DETAILED DESCRIPTION

Figure 1:
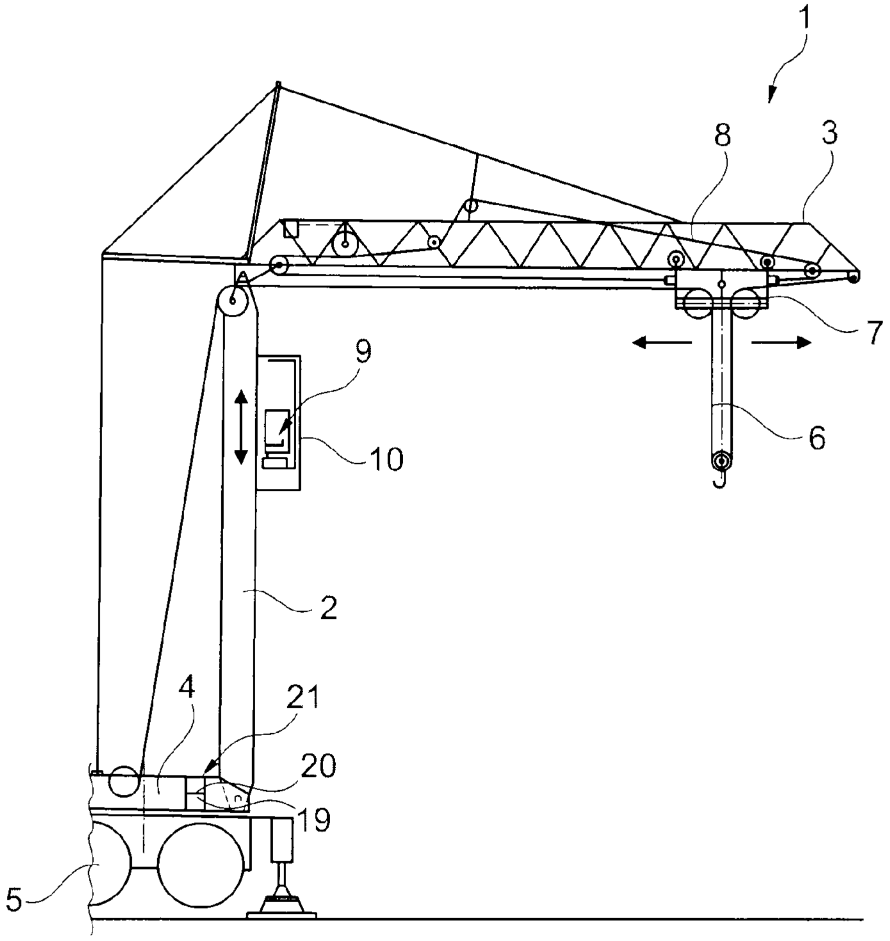
FIG. 1: shows a schematic side view of a fast-erecting crane configured as a tower crane according to an advantageous embodiment of the invention, whose crane operator cabin is height-adjustably mounted on the tower of the crane.
Figure 2:
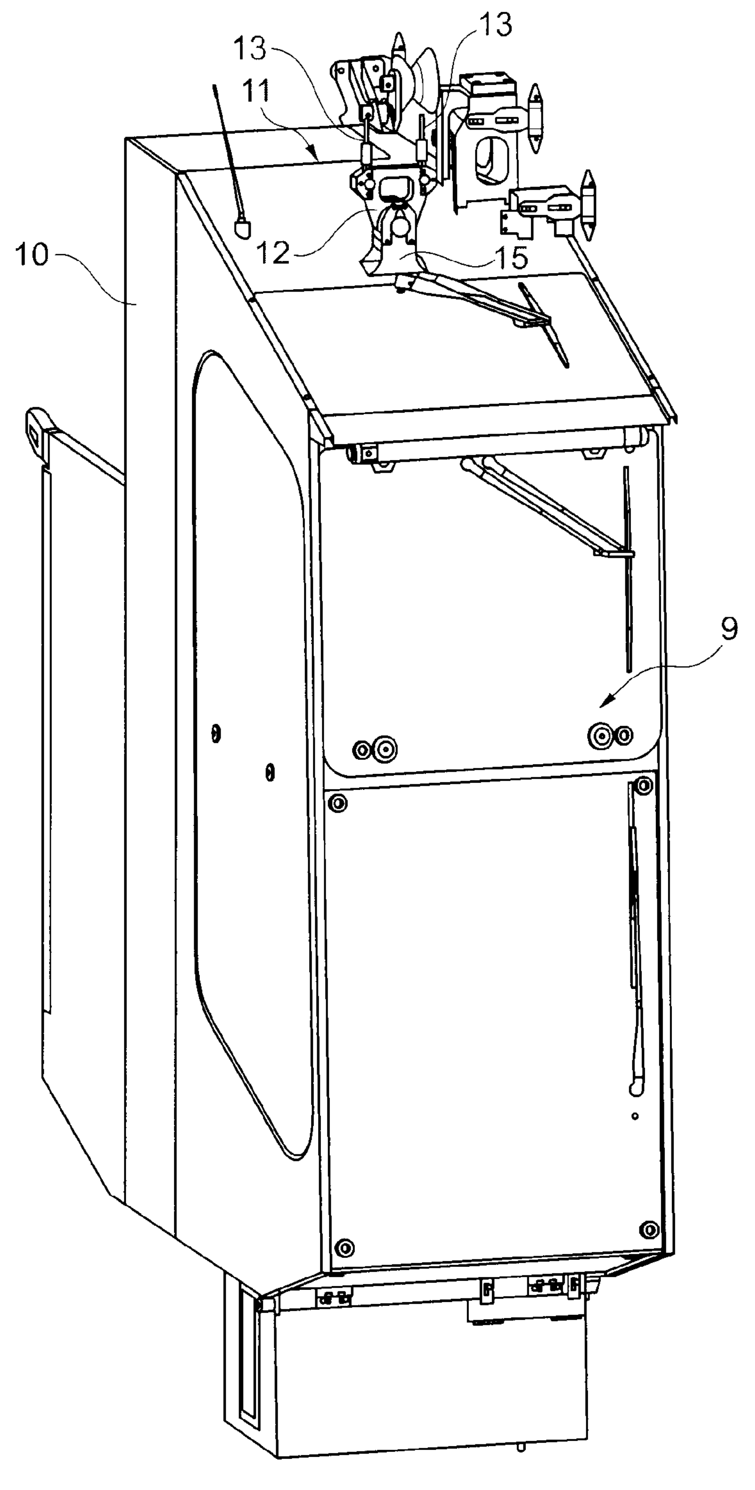
FIG. 2: shows a perspective representation of the crane operator cabin of FIG. 1 and its suspension.

As shown in FIG. 1, the crane 1 can be configured as a tower crane and have a tower 2 which is upright in operation and carries a cantilevered boom 3. With its lower end, the tower 2 can sit on a turntable 4 that is rotatable about an upright axis and is supported on an undercarriage 5 which can be configured as a truck or can be traversable in some other way, but possibly can also form a rigid, non-traversable supporting base.

A trolley 7 can be mounted on the boom 3 so as to be longitudinally traversable, which trolley can be moved to and fro by means of a trolley cable 8. Via the trolley 7, a lifting cable 6 comprising a load hook can be unwound.

The crane 1 comprises a control and/or personnel stand 9 that can be configured as a crane operator or elevator cabin 10. Said control and/or personnel stand 9 is height-adjustably mounted. In particular, said crane operator or elevator cabin 10 can be mounted on the tower 2 so as to be longitudinally traversable, for example by a cabin traveling gear that is guided on the tower profile, for example on its longitudinal beams.

As is shown in FIGS. 2 to 5, the control and/or personnel stand 9 can be retained and be brought into various height positions via a suspension 11 that can engage the chassis, in particular the upper surface of the crane operator or elevator cabin 10. Said cabin 10 can be moved up and down on an outside of the tower 2, for example by means of a roller guide or rail guide along the tower. Possibly, however, the cabin can also be arranged in the interior of the tower profile, for example when it is only utilized as a climbing aid to reach the boom or a control stand arranged at the top, and the tower profile is voluminous enough.

Said suspension 11 in particular can comprise a balancing rocker 12 to which two lifting elements 13 in the form of lifting cables can be articulated, which can be lifted and lowered via a suitable lifting gear drive. For example, two cable drums can be provided to wind and unwind the two lifting cables.

By means of a pivot axis 14 which extends horizontally and engages a central portion of the balancing rocker 12, said balancing rocker 12 is pivotally mounted on a rocker bearing head 15 which can be rigidly connected to the control stand 9, in particular attached to the chassis of the cabin 10.

Figure 3:
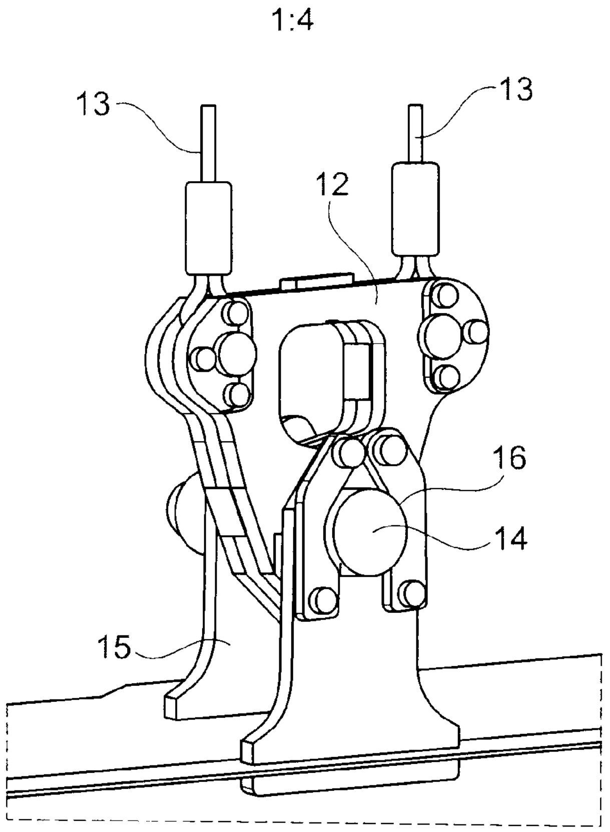
FIG. 3: shows a perspective representation of the suspension of the crane operator cabin of FIG. 2, which shows the balancing rocker with the two lifting cables articulated thereto as well as the measurement axis by which the balancing rocker is pivotally articulated to the rocker bearing head of the suspension.

As is shown in FIG. 3, said rocker bearing head 15 can form a bearing yoke, for example, between whose legs the balancing rocker 12 dips with a bearing portion, wherein the legs of the rocker bearing head 15 and the bearing portion of the balancing rocker 12 can include aligned pivot bearing bores, through which said pivot axis 14 extends. In principle, however, it would also be possible to reverse the arrangement, for example to provide two yoke legs at the bearing portion of the balancing rocker 12, between which the rocker bearing head 15 extends. Further configurations for example in the manner of a cantilevered pivot bearing connection would also be possible.

Said pivot axis 14 is configured as a measurement axis 16 in order to detect the transverse forces acting on the pivot axis 14. Said measurement axis 16 can be configured in the manner of a force measuring bolt, wherein a suitable sensor system can be provided on the measurement axis 16, which can detect said bearing forces and loads that act on the bolt. As mentioned above, said sensor system 17 can comprise for example strain gauges on the measurement axis or a thin-film coating applied thereon in order to measure deformations and hence loads.

Figure 5:
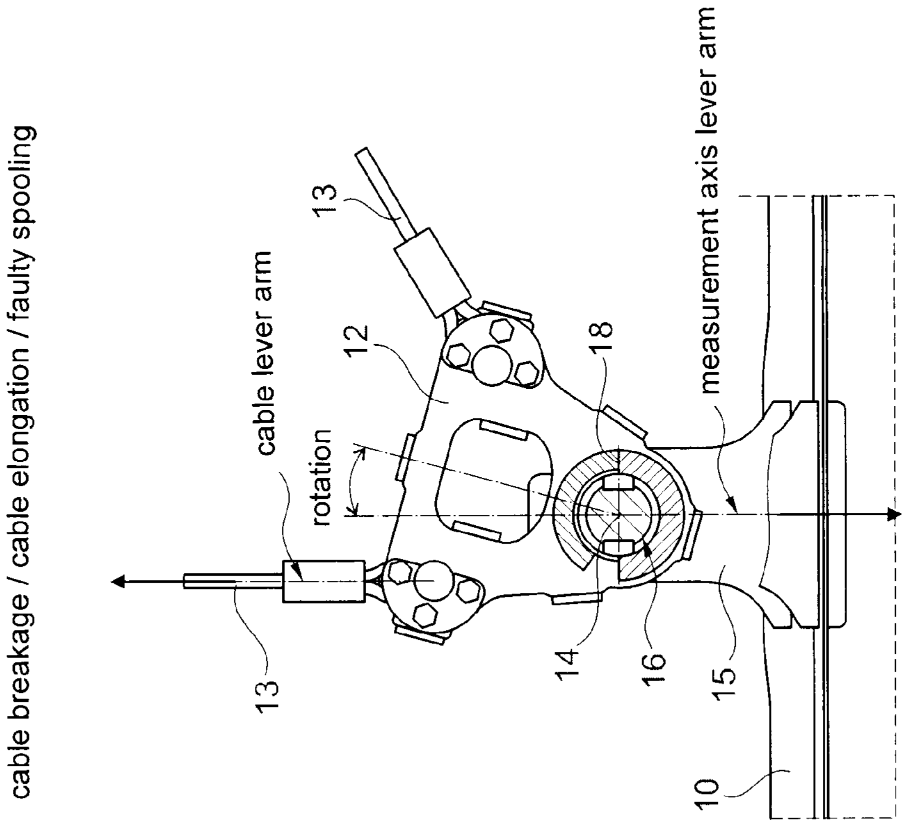
FIG. 5: shows a top view of the balancing rocker and the measurement axis similar to FIG. 4, wherein the balancing rocker is shown in a position that is rotated due to the breakage or a slack cable of one of the lifting cables, in which position the pivot stops have come into engagement.
Figure 4:
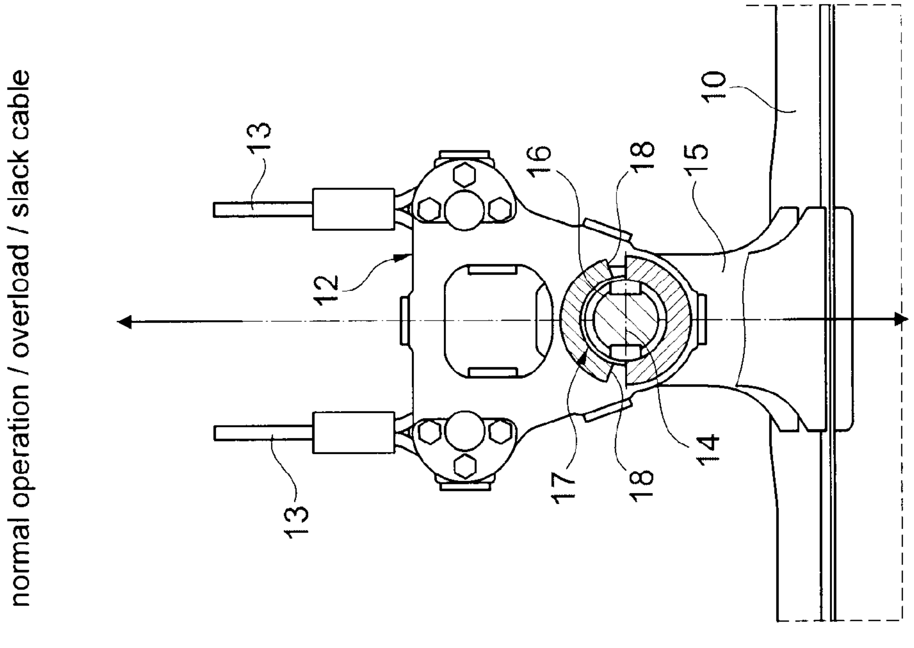
FIG. 4: shows a top view of the balancing rocker and the measurement axis of the suspension from the preceding Figures, wherein the balancing rocker is shown in a non-deflected neutral position in which the pivot stops are out of engagement.

As is shown by a comparison of FIGS. 4 and 5, said measurement axis 16 can be non-rotatably held at the rocker bearing head 15 so that it does not follow rotary movements of the balancing rocker 12. Alternatively, the measurement axis 16 can also be rotatably mounted relative to the rocker bearing head 15 and/or to the balancing rocker 12 so that it does not assume a predetermined rotational position.

The pivotability of the balancing rocker 12 relative to the rocker bearing head 15 advantageously can be limited by pivot stops 18 that can be provided on the balancing rocker 12 and the rocker bearing head 15. In particular, said pivot stops 18 can be arranged around the pivot axis 14 in the direct vicinity of its outer circumference, i.e. in particular around the bearing bores through which the pivot axis 14 extends.

For example, said pivot stops 18 can be formed by protrusions that are formed on the balancing rocker 12 and the rocker bearing head 15 so as not to collide with each other when the balancing rocker 12 pivots relative to the rocker bearing head 15.

As is shown in FIGS. 4 and 5, said pivot stops 18 can be out of engagement with each other in a non-deflected neutral position of the balancing rocker 12, which is shown in FIG. 4, so that the balancing rocker 12 can rotate out of the neutral position unimpededly. On the other hand, the pivot stops 18 come into engagement when the balancing rocker has carried out a predetermined swivel movement, for example by an angle of about +/−10° to +/−20°.

When the pivot stops 18 come into engagement with each other, as is shown in FIG. 5, for example because one of the lifting elements 13 is broken or has been unwound too far, the load state at the measurement axis 16 changes significantly. The eccentrically arranged pivot stops 18 and the forces transmitted thereby exert additional forces on the pivot axis 14, which must balance the lever situation. The loads detected on the measurement axis 16, in particular transverse forces and/or bending moments, undergo a significant change as soon as the pivot stops 18 come into engagement. This change in principle can be the removal of a load or an additional load, which can be detected on the measurement axis.

Advantageously, said pivot stops 18 are configured such that engagement forces are obtained on the abutment surfaces in engagement with each other, which are eccentric with respect to the pivot axis 14 and/or have a lever arm in order to generate a reaction in the measurement axis. In particular, a resultant engagement force can act eccentrically to the measurement axis when pivot stops are in engagement.

As is shown in FIGS. 4 and 5, the pivot stops 18 can comprise two pairs of pivot stops 18, which are arranged on opposite sides of the measurement axis 16, preferably more or less—at least approximately—in a plane that extends horizontally through the pivot axis 14. For example, the pivot stops 18 can extend in a range of 2 o'clock to 4 o'clock or 8 o'clock to 10 o'clock when the pivot axis 14 is viewed in its axial direction.

The pivot stops 18 advantageously are arranged in such a way that depending on the tilting movement of the balancing rocker always only one pair of stops comes into engagement on one side of the pivot axis 14.

The pivot stops 18 form a lever mechanism that converts the torque or holding moment occurring on limitation of the swivel movement of the balancing rocker 12 into a significant change of the load acting on the measurement axis 16. In particular, the lever mechanism formed by the pivot stops 18 can multiply the load introduced into the suspension by the cabin, so that the load acting on the measurement axis 16 increases distinctly, in particular increases very much more than would be the case when the permissible load capacity is exceeded only slightly, for example on entry of an additional person.

As is shown in FIG. 5, what is obtained when a pivot stop pair comes into engagement during a correspondingly far rotation of the balancing rocker, on the one hand is a lever arm of the measurement axis or of the cabin load going through the measurement axis relative to the pivot stop pair in engagement and on the other hand a lever arm of the still carrying cable 13 relative to the pivot stop pair 18, wherein said lever arms each substantially can correspond to the horizontal distance between the center of the measurement axis and the point of engagement of the pivot stops on the one hand and the line of action of the cable tractive force and the point of engagement of the pivot stops 18 on the other hand.

As the cable force in the still carrying cable 13 corresponds to the load of the cabin along with payload and attachment parts, so that a vertical equilibrium of forces can be obtained, the change of the load obtained on the measurement axis can be controlled by the length of said lever arms.

For example, the length of said lever arms can be formed by a corresponding design of the geometry of the balancing rocker and the rocker bearing head, in particular the articulation point of the lifting elements 13 at the balancing rocker and the arrangement of the pivot stops 18 in such a way that the load occurring on the measurement axis 16 and hence measured increases by 50% or more, when said pivot stops 18 come into engagement due to a corresponding swivel movement of the balancing rocker 12. For example, when the cabin 10 along with a permissible, maximum payload has a weight of 1000 kg, said lever arms can be adjusted such that a load of 1500 kg occurs on the measurement axis 16 when the pivot stops 18 come into engagement. In so far, it is easy to distinguish between a normal overload and a cable breakage or a faulty spooling, for example when a first threshold value of 1050 kg is exceeded and a second threshold value of for example 1400 kg is not exceeded yet, so that a normal overload with a still operable suspension can be assumed, while in the event of an exceedance of said second threshold value of for example 1400 kg a cable breakage or a faulty spooling can be assumed. Said values are to be understood merely by way of example.

The sensor system 17 associated with the measurement axis 16 emits a load signal which characterizes the load situation at the measurement axis 16, in particular the transverse forces obtained there in terms of their amount and/or in terms of their direction.

Said load signal of the sensor system 17 can be evaluated by a control device 20 of the crane 1, which control device 20 is of the electronic type and for example can comprise a microprocessor that can execute a control program stored in a memory.

Said control device 20 can include an evaluating device 19 that evaluates the measurement signal of the measurement axis 16 in the above-mentioned way, in particular compares the same with two threshold values which on the one hand characterize the normal transition from a normal, permissible load capacity to an overload and on the other hand characterize the engagement of the pivot stops 18 and the resulting change of the load acting on the measurement axis.

Said control device 20 on the one hand can emit a warning signal and/or at least stop one drive of the crane, in particular the lifting gear drive for the height adjustment of the control stand 9, when the load signal of the sensor system 17 indicates an exceptional load state, for example excessive transverse forces on the measurement axis.

Alternatively or additionally, however, said control device 20 possibly can also intervene in the actuation of the drives by way of precaution. For example, when the sensor system 17 detects that the balancing rocker tilts too strongly, the control device 20 can try to adjust the lifting gear drive from which the lifting cable that is too slack or too tight is unwound.

Alternatively or additionally, the control device 20 can also emit a preventive maintenance signal when the load signals of the sensor system 17 still do not indicate a critical state, but already indicate significant changes with respect to the original load spectrum when new.

We claim:

1. A fast-erecting crane comprising:

a telescopable and/or luffable tower with a height-adjustable mounted control and/or personnel stand configured to be lifted and lowered by two lifting elements, wherein the two lifting elements are articulated to a balancing rocker that is luffably mounted on a rocker bearing head connected to the control and/or personnel stand about a horizontal pivot axis;

a monitoring and/or safety device for monitoring the control and/or personnel stand, wherein the pivot axis is configured as a measurement axis for detecting the load state of the luffable bearing of the balancing rocker and for providing a load signal to the monitoring and/or safety device; and a lever mechanism for generating a change of the measurement axis load acting on the measurement axis in dependence on a rotation of the balancing rocker relative to the rocker bearing head, and wherein the lever mechanism is associated with the balancing rocker and/or the rocker bearing head and/or the measurement axis.

2. The fast-erecting crane of claim 1, wherein the lever mechanism is configured to convert a holding and/or braking moment occurring during limiting and/or braking of the rotation of the balancing rocker with respect to the rocker bearing head into a load acting on the measurement axis.

3. The fast-erecting crane of claim 1, further comprising pivot stops on the balancing rocker and the rocker bearing head, wherein the pivot stops are out of engagement in a non-deflected neutral position of the balancing rocker and come into engagement when reaching a predetermined swivel position of the balancing rocker and block a further swivel movement of the balancing rocker relative to the rocker bearing head, and wherein the lever mechanism comprises the pivot stops.

4. The fast-erecting crane of claim 3, wherein the pivot stops are arranged on a partial circle around the measurement axis and/or adjacent to the outer circumference of the measurement axis.

5. The fast-erecting crane of claim 4, wherein said partial circle has a diameter of less than 300% of the outside diameter of the measurement axis.

6. The fast-erecting crane of claim 5, wherein the pivot stops are in a horizontal plane transverse to the luffing axis of the lifting elements.

7. The fast-erecting crane of claim 6, wherein the pivot stops in an engaged position are configured to generate an abutment force eccentrically to the axis of rotation.

8. The fast-erecting crane of claim 3, wherein the pivot stops are in a horizontal plane transverse to the luffing axis of the lifting elements.

9. The fast-erecting crane of claim 3, wherein the pivot stops in an engaged position are configured to generate an abutment force eccentrically to the axis of rotation.

10. The fast-erecting crane of claim 1, wherein the measurement axis is non-rotatably attached to the rocker bearing head, and wherein the balancing rocker is retained at the measurement axis so as to be rotatable relative to the measurement axis.

11. The fast-erecting crane of claim 1, wherein the measurement axis comprises a sensor system, and wherein the sensor system comprises a strain gauge and/or a strain-sensitive thin-film coating.

12. The fast-erecting crane of claim 1, wherein the rocker bearing head is rigidly attached to the control and/or personnel stand.

13. The fast-erecting crane of claim 1, wherein the at least two lifting elements are each configured as flexurally slack traction elements.

14. The fast-erecting crane of claim 13, wherein the flexurally slack traction elements comprise lifting cables.

15. The fast-erecting crane of claim 1, wherein the balancing rocker defines a triangle comprising articulation points of the lifting elements and the pivot axis, wherein the articulation points of the lifting elements are along a straight line above the pivot axis.

16. The fast-erecting crane of claim 15, wherein in the non-deflected neutral position of the balancing rocker the pivot axis is positioned on the balancing rocker centrally between the articulation points of the lifting elements.

17. A fast-erecting crane comprising:

a telescopable and/or luffable tower with a height-adjustable mounted control and/or personnel stand configured to be lifted and lowered by two lifting elements, wherein the two lifting elements are articulated to a balancing rocker that is luffably mounted on a rocker bearing head connected to the control and/or personnel stand about a horizontal pivot axis;

a monitoring and/or safety device for monitoring the control and/or personnel stand, wherein the pivot axis is configured as a measurement axis for detecting the load state of the luffable bearing of the balancing rocker and for providing a load signal to the monitoring and/or safety device; and an evaluating device for evaluating the measurement signal of the measurement axis, wherein the evaluating device is configured to employ a height and/or a change of the measurement signal of the measurement axis to distinguish between an overload of the control and/or personnel stand at a proper operating condition of the lifting elements and the balancing rocker, and a malfunction of the lifting elements and/or the balancing rocker.

18. The fast-erecting crane of claim 17, wherein the evaluating device is configured to compare the measurement signal of the measurement axis with at least a first threshold value and a second threshold value, wherein the first threshold value characterizes the load acting on the measurement axis on transition between maximum permissible load and overload of the control and/or personnel stand at a proper operating condition of the lifting elements and the balancing rocker, and wherein the second threshold value characterizes an increase of the load acting on the measurement axis with an excessive deflection of the balancing rocker from its neutral position.

19. A fast-erecting crane comprising:

a telescopable and/or luffable tower with a height-adjustable mounted control and/or personnel stand configured to be lifted and lowered by two lifting elements, wherein the two lifting elements are articulated to a balancing rocker that is luffably mounted on a rocker bearing head connected to the control and/or personnel stand about a horizontal pivot axis; and a monitoring and/or safety device for monitoring the control and/or personnel stand, wherein the pivot axis is configured as a measurement axis for detecting the load state of the luffable bearing of the balancing rocker and for providing a load signal to the monitoring and/or safety device, wherein the measurement axis is configured to detect transverse forces acting on the measurement axis in terms of an amount and/or a direction of the transverse forces.

20. A fast-erecting crane comprising:

a telescopable and/or luffable tower with a height-adjustable mounted control and/or personnel stand configured to be lifted and lowered by two lifting elements, wherein the two lifting elements are articulated to a balancing rocker that is luffably mounted on a rocker bearing head connected to the control and/or personnel stand about a horizontal pivot axis; and a monitoring and/or safety device for monitoring the control and/or personnel stand, wherein the pivot axis is configured as a measurement axis for detecting the load state of the luffable bearing of the balancing rocker and for providing a load signal to the monitoring and/or safety device, wherein the measurement axis is configured to detect bending moments acting on the measurement axis.

* * * * *